United States Patent
Zhang et al.

(10) Patent No.: US 10,392,276 B2
(45) Date of Patent: Aug. 27, 2019

(54) $TIO_2$ BASE COAGULANT AND ITS APPLICATION

(71) Applicant: NANJING UNIVERSITY, Nanjing, Jiangsu Province (CN)

(72) Inventors: Shujuan Zhang, Nanjing (CN); Xiaomeng Wang, Nanjing (CN); Minghui Li, Nanjing (CN); Xiaojie Song, Nanjing (CN); Bingdang Wu, Nanjing (CN)

(73) Assignee: NANJING UNIVERSITY (CN)

( * ) Notice: Subject to any disclaimer, the term of this patent is extended or adjusted under 35 U.S.C. 154(b) by 241 days.

(21) Appl. No.: 15/302,987

(22) PCT Filed: Jun. 23, 2015

(86) PCT No.: PCT/CN2015/082136
§ 371 (c)(1),
(2) Date: Oct. 8, 2016

(87) PCT Pub. No.: WO2016/192144
PCT Pub. Date: Dec. 8, 2016

(65) Prior Publication Data
US 2017/0137306 A1    May 18, 2017

(30) Foreign Application Priority Data

Jun. 5, 2015   (CN) .......................... 2015 1 0301771

(51) Int. Cl.
*C02F 1/52*     (2006.01)
*B01D 21/01*    (2006.01)
(Continued)

(52) U.S. Cl.
CPC ............ *C02F 1/5245* (2013.01); *B01D 21/01* (2013.01); *C01G 23/0536* (2013.01);
(Continued)

(58) Field of Classification Search
CPC .................................................... C02F 1/5245
See application file for complete search history.

(56) References Cited

U.S. PATENT DOCUMENTS

2011/0019277 A1* 1/2011 Sager ............... B29D 11/00865
                                                    359/580

FOREIGN PATENT DOCUMENTS

WO    WO-2009005393    *  1/2009   ............ C02F 1/5236

* cited by examiner

*Primary Examiner* — Peter Keyworth
(74) *Attorney, Agent, or Firm* — PROI Intellectual Property US (57) ABSTRACT

The present invention provides a $TiO_2$-based coagulant and use thereof. The $TiO_2$-based coagulant is obtained by the following steps: uniformly mixing acetylacetone and ethanol and dropwise adding titanium tetrachloride to obtain a solution A; mixing deionized water and ethanol to obtain a solution B; dropwise adding solution B to solution A; stirring to obtain a sol, and then aging the sol to constant weight to obtain the $TiO_2$-based coagulant. The $TiO_2$-based coagulant can be used for treating waste water and algae-laden water. The $TiO_2$-based coagulant exhibits good coagulation effects and high stability, solves the problem of too low effluent pH caused by strong inorganic titanate acidity and is favorable to the subsequent treatment of waste water.

10 Claims, 5 Drawing Sheets

(51) Int. Cl.
*C01G 23/053* (2006.01)
*C02F 1/66* (2006.01)
*C02F 101/30* (2006.01)

(52) U.S. Cl.
CPC .............. *C02F 1/5236* (2013.01); *C02F 1/66* (2013.01); *C02F 2101/30* (2013.01)

# TIO₂ BASE COAGULANT AND ITS APPLICATION

CROSS REFERENCE TO RELATED APPLICATIONS

The present application is the US national stage of International Patent Application of PCT/CN2015/082136 filed on Jun. 23, 2015, which, in turn, claims priority to Chinese Patent Application CN 201510301771.9 filed on Jun. 5, 2015.

TECHNICAL FIELD

The present invention relates to the technical field of water treatment, and in particular, relates to a $TiO_2$-based coagulant and use thereof.

BACKGROUND

Coagulation sedimentation is a commonly used unitary operation in drinking water and waste-water treatment technique. Aluminum-based and iron-based inorganic coagulants are the most commonly used coagulants nowadays. However, the water treated with aluminum-based coagulants still contains a large amount of residue aluminum which exceeds the specified standard. Long-term drinking of such water will cause dementia. Iron-based coagulants, although without biological toxicity, may lead to coloration of the effluent is excessively used. In addition, the iron ions generated during the hydrolysis cause strong corrosion to the water treatment equipment. In addition, when aluminum-based or iron-based coagulant is used, a large amount of chemical sludge is produced, and improper sludge treatment may lead to serious secondary pollution. Therefore, searching for new and highly efficient wastewater treatment inorganic coagulants which satisfy the requirements for water and the waste water treatment has become a hot research subject in recent years.

Titanium salt is a new water treatment agent which has gradually attracted the attention of researchers in recent years. Compared with the conventional iron and aluminum coagulants, titanium salt has a strong electrical neutralization capability, the formed floc is large and compact and the sedimentation speed is higher, which is more favorable to solid-liquid separation and improvement of the decontamination effect. In addition, the titanium salt causes less corrosion to the water treatment equipment, and would not cause the problem of chrominance. Further, the titanium has no toxicity, and thus the titanium resident in the water would not cause damages to the human health. At the same time, it has been reported in a study that TiCl4, in cold conditions, achieves a better coagulation effect that the traditional aluminum or iron salt coagulant does, which is highly significance for the practice of treatment of waste water in China's northwest and northeast in winter. In addition, the related studies report that when titanium sulfate and titanium tetrachloride are used as coagulants, the removal rate of the organic matters is obviously higher than that achieved when the traditional aluminum or iron salt is used. After the resulting sludge upon coagulation is subjected to high temperature calcination, titanium dioxide photocatalyst which has a great application value can be obtained, which effectively solves the problem of a large amount of sludge is caused during the coagulation process, and achieves double effects of water purification and sludge reuse.

However, during use of the titanium tetrachloride, titanium sulfate and other titanium salt coagulants, because of their strongly acidity and Ti4+ thereof at hydrolysis will release a lot of H+, pH of the water resulted from the coagulation is relatively low, which affects further use of the water. Further, titanium tetrachloride, titanium sulfate and other titanium salts have a very fast hydrolysis rate in water, and a titanium hydroxyl hydrolysis product which is the most effective cannot be formed, thereby affecting the coagulation effect. By modifying the coagulant in an artificial manner, a better coagulation effect may be achieved. Based on the hydrolysis characteristics of the titanium salt, at present the titanate inorganic coagulant is optimized mainly by using the method for preparing a polymerization titanate coagulant or an organic polymer floc formulation. Chinese patent application No. CN102701387A has disclosed a titanium tetrachloride-poly dimethyl diallyl ammonium chloride inorganic-organic compound flocculant and a preparation method thereof. According to the invention, the deficiency of the single flocculant is addressed by combined use of an inorganic flocculant and an organic polymer flocculant, the application range thereof is enlarged, the residual metal ion concentration is lowered, and secondary pollution is relieved. Chinese patent application No. CN103964554A has disclosed a polymeric titanium sulfate-poly dimethyl diallyl ammonium chloride coagulant complex. According to the invention, by using the hydrolysis characteristics of the titanium sulfate, a polymerization titanium sulfate is prepared first by adding a base to pre-hydrolyze the titanium sulfate, and then a coagulant having a high stability is obtained by complexing with the organic polymer flocculant. Although the methods of pre-preparing the polymerization titanium sulfate and complexing with the organic polymer coagulant improve the coagulation effect and enlarge the application scope of the coagulant, these two materials both need to be on-site prepared before use, the preparation is complicated, and the prepared liquid cannot be stored for a long time, which reduces the time effectiveness of the titanate coagulant during the water treatment. Therefore, a more highly efficient and more convenient titanate coagulant preprocessing method has a great significant.

The sol-gel method is a commonly used method for preparing the titanium dioxide materials, wherein the inorganic salt or titanium ester is used as the raw material, a sol is directly formed by hydrolysis, and a gel is further obtained via polycondensation. Titanium dioxide particles are obtained after the gel experiences calcination. During the sol-gel preparation, generally a hydrolysis inhibitor is added to regulate the hydrolysis-polycondensation rate to control synthesis of the gel. The properties of the finally resulted material may be implemented by adjusting a proportion of the components at the sol stage. The process of preparing the titanium dioxide by means of sol-gel method generally produces the final products TiO2 nanoparticles, which are used in the field such as photocatalysis and hydrolysis. However, the intermediate TiO2 dry gel in the synthesis process is less concerned. At present, it is only reported that the $TiO_2$ dry gel is used as an adsorbent. For example, Chinese patent No. ZL201210509803.3 has disclosed a $TiO_2$ dry gel material which can be used as an adsorbent, and a preparation method and use thereof. In this patent, tetrabutyl titanate is used as a titanium source, acetylacetone is used as a hydrolysis inhibitor, by adjusting the proportion of raw materials, a $TiO_2$ dry gel is formed by means of the sol-gel synthesis. The dry gel has good adsorption properties against azo dyes, the adsorption capacity thereof is comparable to that of the activated carbon material. It should be noted that the $TiO_2$ dry gel is insoluble in water. For a coagulant, good water solubility is an important prerequisite for bringing its flocculation and sedimentation properties thereof to full play. At present, there is no yet disclosure of the water-soluble $TiO_2$ dry gel. The most prominent problem during the use of an inorganic titanium salt as the coagulant is that the hydrolysis rate is high and thus the pH of the resulted water is low. To overcome this problem, by the sol-gel method, inorganic titanium salt is modified, and the resulted water-soluble $TiO_2$ dry gel has a controllable hydrolysis rate, and may be potentially used as a coagulant. There is still no report on using the $TiO_2$-based material as a coagulant for water treatment.

SUMMARY

In view of the above problems, the present invention provides a $TiO_2$-based coagulant, which may be extensively used in the field of treatment of waste water and algae-laden water; the present invention achieves good coagulation efficiency and high sedimentation rate. The present invention is implemented as follows:

A $TiO_2$-based coagulant is disclosed, wherein the coagulant is obtained by:

(a) Uniformly mixing acetylacetone and ethanol at a volume ratio of 1:7-166, dropwise adding titanium tetrachloride, and stirring at a rate of 100-300 rpm for 10 minutes to obtain a solution A, a molar ratio of the titanium tetrachloride to the acetylacetone being 32-2.7:1;

(b) Mixing deionized water and ethanol at a volume ratio of 1:2-23 to obtain a solution B;

(c) Dropwise adding solution B to solution A, and then stirring for 30-60 minutes at a rate of 100-300 rpm to obtain a uniform sol, a molar ratio of the added deionized water to titanium tetrachloride being 1-8:1; and (d) Placing the sol at 15-55° C. for aging tills the weight thereof becomes constant, to obtain the $TiO_2$-based coagulant.

Further, in the present invention, the dropwise addition of solution B to solution A in step c comprises the dropwise addition of solution B to solution A at a rate of 0.5-1.5 mL/min.

Use of the $TiO_2$-based coagulant according to the present invention in the treatment of waste water is further disclosed.

Further, the use of $TiO_2$-based coagulant according to the present invention in the treatment of waste water comprises: adjusting a pH value of the waste water to 4-11, and inputting the $TiO_2$-based coagulant into the waste water in a dosage range of 20-100 mg/L for sedimentation of pollutants.

Use of the $TiO_2$-based coagulant according to the present invention in the treatment of algae-laden water is further disclosed.

Further, the use of TiO2-based coagulant according to the present invention in the treatment of algae-laden water comprises: adjusting a pH value of the waste water to 6-10, and inputting $TiO_2$-based coagulant into the algae-laden water in a dosage range of 20-100 mg/L for sedimentation of pollutants.

In the present invention, the waste water comprises industrial waste water, domestic sewage, and algae-laden water which exists in the nature.

The present invention employs a sol-gel method. In the method, titanium tetrachloride is used as a precursor and acetylacetone is used as an inhibitor. $TiO_2$-based coagulant is prepared by regulating the proportion of various raw materials and under certain formation condition of the dried xerogel. As compared with the prior art, the present invention has the following beneficial effects:

(1) The method for the preparation of the TiO2-based coagulant is simple and environmental friendly; in addition, the obtained $TiO_2$-based coagulant has a good coagulation efficiency and high stability. The $TiO_2$-based coagulant is in the form of light-yellow particles under room temperature and may be conveniently stored for a long time.

(2) The $TiO_2$-based coagulant prepared according to the present invention overcomes the defect that the effluent pH is too low due to strong acidity of the inorganic titanate, improves the pH of the resulted water while enhancing the coagulation efficiency, and facilitates the subsequent water treatment.

(3) During the preparation of $TiO_2$-based coagulant according to the present invention, the hydrolysis rate of the titanate is controlled by adding an inhibitor, which is favorable to the formation of the most effective titanium hydroxyl hydrolysate product, and thus broadens the application of the titanium-based coagulant.

DETAILED DESCRIPTION

The present invention is further described with reference to specific embodiments and application examples. However, the protection scope of the present invention is not limited thereto.

Example 1

Preparation of $TiO_2$ coagulant and test of coagulant water sample (1) Preparation of the $TiO_2$-Based Coagulant a. 0.73 mL acetylacetone was added to 20 mL ethanol at a volume ratio of 1:28; the mixture was stirred at a rate of 100 rpm for 10 minutes; then TiCl$_4$ was dropwise added, a molar ratio of the dropwise added TiCl$_4$ to the acetylacetone being 8:1 (about 3.11 ml of TiCl$_4$); and after added with the TiCl$_4$, the mixture was stirred at a rate of 100 rpm for 10 minutes to obtain a transparent solution, i.e., a solution A;

b. 2 mL deionized water was uniformly mixed with 10 mL ethanol at a volume ratio of 1:5 to obtain a solution B, a molar ratio of the deionized water to the TiCl$_4$ being 4:1 in this embodiment;

c. solution B was dropwise added to solution A at a rate of 1 mL/min, and then the mixture of the solutions was constantly stirred at a rate of 100 rpm for 30 minutes, to obtain a stable sol; and d. the sol was placed in a 50° C. oven for aging (for about 7 days) until a constant weight is reached, to thus obtain the TiO$_2$-based coagulant.

(2) Treatment of Humic Acid-Kaolin Simulated Water Sample With TiO$_2$-Based Coagulant Water quality indicators of the humic acid-kaolin simulated water sample include the following: initial turbidity: 33.0±0.5 NTU, pH: 7.15±0.1, DOC: 31.0±1.0 mg/L.

Figure 1:
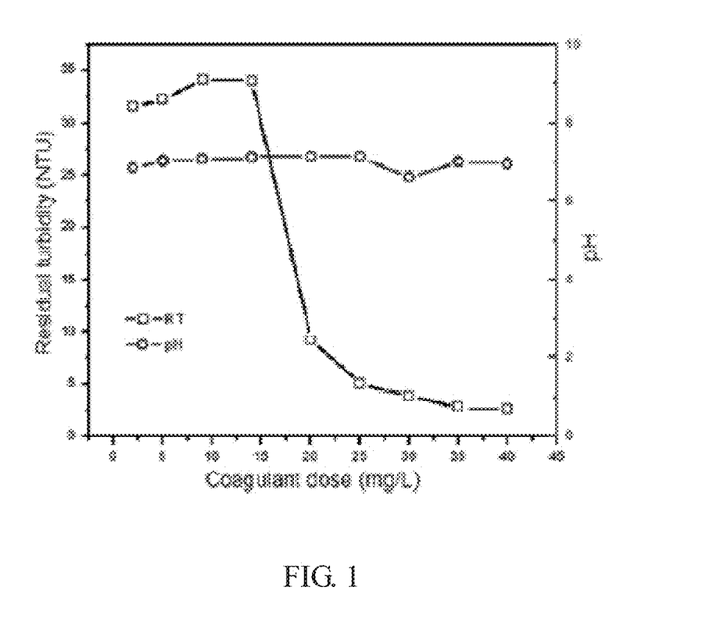
FIG. 1 is a schematic diagram illustrating the treatment effect of $TiO_2$-based coagulant in a humic acid-kaolin simulated wastewater with different dosages of the $TiO_2$-based coagulant according to Example 1.

With a dosage in the range of 2-40 mg/L, the TiO$_2$-based coagulant according to the present embodiment was mixed into the humic acid-kolin simulated water sample, and the mixture was then stirred at a rate of 200 rpm for 1 minute and then stirred at a rate of 40 rpm for 15 minutes; the mixture was then set still for 20 minutes, and finally the residual turbidity (RT) and effluent pH of the water sample were tested, with the test result shown in FIG. 1.

As seen from FIG. 1, when the dosage range of the TiO$_2$-based coagulant is within 2-40 mg/L, the residual turbidity increases first. This is because insufficient dosage fails to create the coagulation effect, and the hydrolytic product of the TiO$_2$-based coagulant increases the residual turbidity. When the dosage of the TiO$_2$-based coagulant is over 15 mg/L, the residual turbidity starts a sharp increase. When the dosage of the TiO$_2$-based coagulant is over 35 mg/L, the residual turbidity decreases below 3 NTU, indicating that the TiO$_2$-based coagulant has a good coagulation effect. Further, as seen from FIG. 1, within the entire dosage range of the TiO$_2$-based coagulant, the effluent pH of the solution subjected to the coagulation treatment remains almost unchanged, not to cause any decrease of the pH value. This indicates that TiO$_2$-based coagulant successfully overcomes the difficulty that the effluent pH resulted from treatment using a titanate coagulant is too low.

(3) Treatment of Chlamydomonas Reinhardtii Simulated Water Sample with TiO$_2$-Based Coagulant Water quality indicators of the chlamydomonas reinhardtii simulated water sample include the following: initial turbidity: 16.0±0.5 NTU, initial pH: 10.2±0.1.

The dosage of TiO$_2$-based coagulant was 40 mg/L and the initial solution pH was adjusted to 5.0-10.0. The mixture was stirred at a rate of 200 rpm for 1 minute and then stirred at a rate of 40 rpm for 15 minutes, then the mixture was set still for 20 minutes, and finally the water quality was tested, with the test result shown in FIG. 2.

Figure 2:
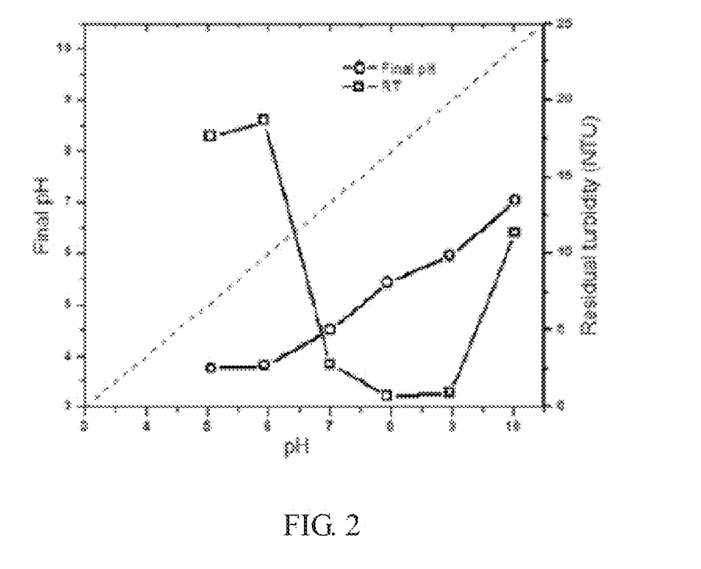
FIG. 2 is a schematic diagram illustrating the treatment effect of $TiO_2$-based coagulant according to Example 1 when used for treating chlamydomonas reinhardtii simulated waste water with various initial pH values.

As seen from FIG. 2, when the initial solution pH was in the range of 7-9, the residual turbidity obviously decreased; especially, when the pH was 8 and 9, the residual turbidity decreased to be lower than 1 NTU and the effluent was very clear after the coagulation treatment. When the initial solution pH was in the range of 5-10, the pH of the solution subjected to the treatment with the TiO$_2$-based coagulant decreased. With respect to the alga solution having an initial pH ranging from 7 to 9, the pH of the solution subjected to the treatment with the TiO$_2$-based coagulant decreased to 4.5-6, While with respect to the alga solution having an initial pH ranging from 7 to 9, if TiCl4 was directly added into the solution, solution pH sharply decreased to be lower than 3, making it difficult for flocculation precipitation to generate.

(4) Treatment of *Microcystis Aeruginosa* Simulated Water Sample with TiO$_2$-Based Coagulant Water quality indicators of the *microcystis aeruginosa* simulated water sample include the following: initial turbidity: 53.0±1.0 NTU, initial pH: 8.0±0.1.

Figure 3:
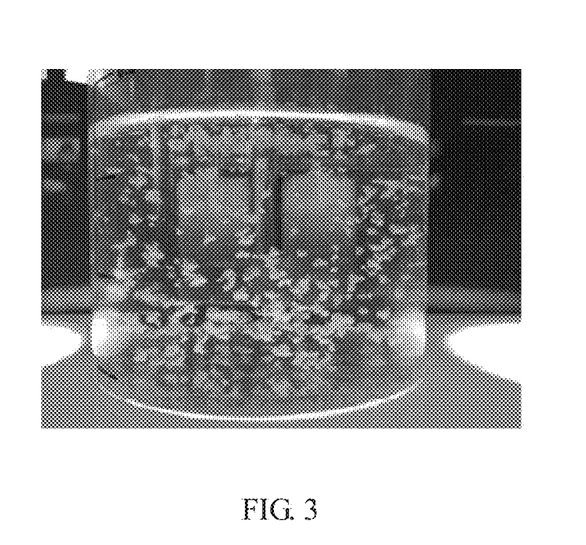
FIG. 3 is a schematic diagram illustrating the treatment effect of $TiO_2$-based coagulant according to Example 1 when used for treating *microcystis aeruginosa* simulated waste water.

The TiO$_2$-based coagulant was input with a dosage in the range of 20-200 mg/l, the mixture was stirred at a rate of 200 rpm for 1 minute and then stirred at a rate of 40 rpm for 15 minutes; and then the mixture was set still for 20 minutes, and finally the water quality was tested. During the treatment of the *microcystis aeruginosa* simulated water sample with the TiO$_2$-based coagulant, the generated floc had a large volume and a high sedimentation speed. After the treatment, the residual turbidity decreased below 1 NTU, and the algae density decreased from the initial value of 3×10$^6$ cells/mL to 2×10$^4$ cells/mL. FIG. 3 is a schematic diagram illustrating an effect of treatment of *microcystis aeruginosa* simulated waste water with TiO$_2$-based coagulant. Obviously, TiO$_2$-based coagulant performed well in treating the *microcystis aeruginosa* waste water.

(5) Treatment of Cr (III) Simulated Water Sample With TiO$_2$-Based Coagulant

Water quality indicators of the Cr (III) simulated water sample include the following: initial Cr (III) concentration: 20.0±1.0 mg/L, pH: 10.4±0.1, initial turbidity: 75.4±1.0 NTU.

Figure 4:
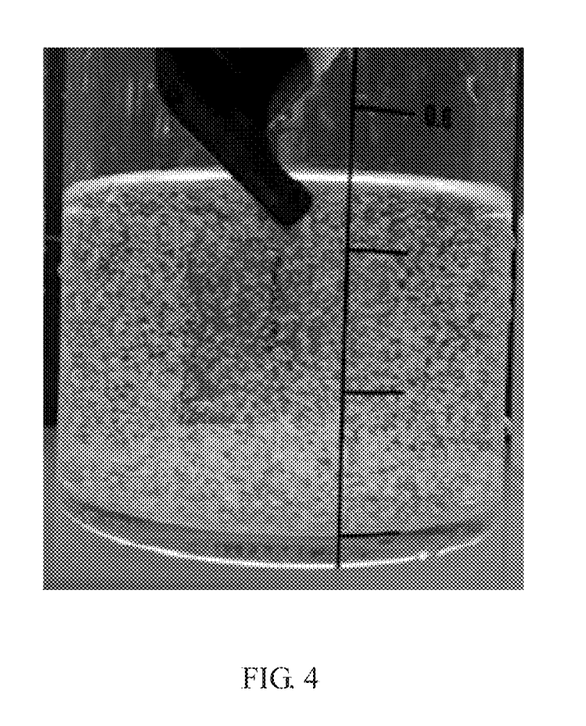
FIG. 4 is a schematic diagram illustrating the treatment effect of $TiO_2$-based coagulant according to Example 1 when used for treating Cr (III) simulated waste water.

The TiO$_2$-based coagulant was input at a dosage of 30 mg/l, the mixture was stirred at a rate of 200 rpm for 1 minute and then stirred at a rate of 40 rpm for 15 minutes, then the mixture was set still for 20 minutes, and finally the water quality was tested. During the low speed stirring which was performed after the high speed stirring was completed, big and compact floc was generated. As illustrated in FIG. 4, after the mixture was set still for 20 minutes, the supernatant thereof became clear, with a residual turbidity of lower than 2 NTU. The Cr (III) concentration in the supernatant was lower than 0.2 mg/L, and the removal rate of the Cr(III) was over 99%. In addition, upon completion of coagulation, the effluent pH was 8.82, exhibiting no strong acidity.

As seen from (2) to (5), when the pH is 6-10, and the dosage is in the range of 20-100 mg/L, the TiO$_2$-based coagulant has a good coagulation effect on the alga blooming water.

(6) Treatment of Acid Orange 7 (AO7) Dyeing Simulated Water Sample With TiO$_2$-Based Coagulant Water quality indicators of the AO7 dyeing simulated water sample: initial concentration: 60.0±1.0 mg/L, pH: 4.4±0.1.

Figure 5:
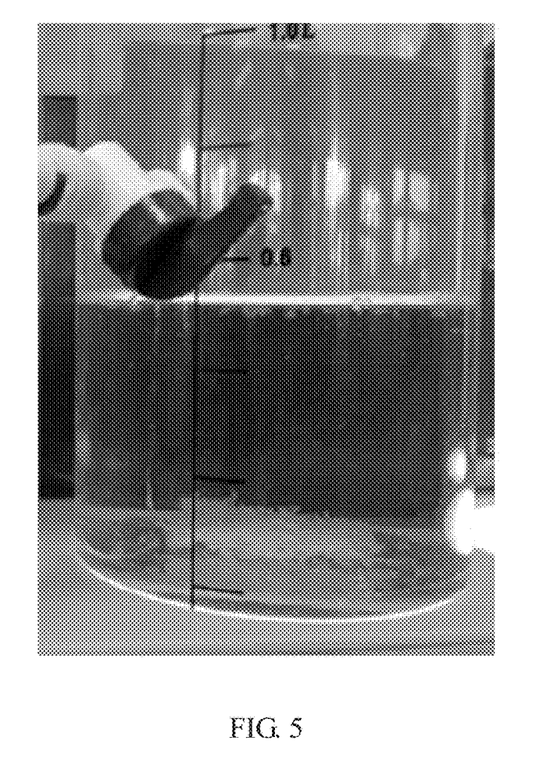
FIG. 5 is a schematic diagram illustrating the treatment effect of $TiO_2$-based coagulant according to Example 1 when used for treating AO7 simulated waste water.

The TiO2-based coagulant was input at a dosage of 50 mg/l, the mixture was stirred at a rate of 200 rpm for 1 minute and then stirred at a rate of 40 rpm for 15 minutes, then the mixture was set still for 20 minutes, and finally the water quality was tested. Upon completion of coagulation, the supernatant thereof became obviously lighter in color. As illustrated in FIG. 5, the concentration of AO7 decreased to 40.8 mg/L after coagulation. The removal rate of AO7 during the coagulation process reached 32.1%.

(7) Treatment of Chrome Tanning Waste Water (the Waste Water is Taken from a Printing and Dyeing Factory in Haimen City, Jiangsu Province)

Water quality indicators of the chrome tanning waste water: initial Cr (III) concentration: 15.5.0±1.0 mg/L, pH: 10.4±0.1, initial turbidity: 45.7±1.0 NTU.

The TiO2-based coagulant was input at a dosage of 40 mg/l, the mixture was stirred at a rate of 200 rpm for 1 minute and then stirred at a rate of 40 rpm for 15 minutes, then the mixture was set still for 20 minutes, and finally the water quality was tested. A comparison was made with polymerization FeCl3 (the content of Fe is 30%, meeting industry level), which was input at a dosage of 40 mg/l, the mixture was stirred at a rate of 200 rpm for 1 minute and then stirred at a rate of 40 rpm for 15 minutes, then the mixture was set still for 20 minutes, and finally the water quality was tested.

Figure 6:
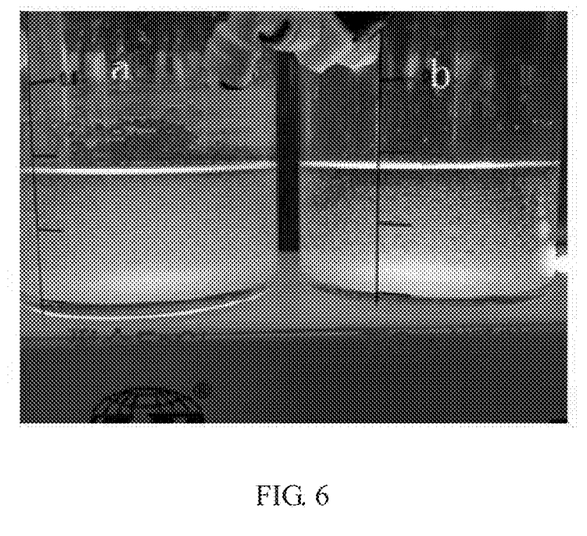
FIG. 6 is a schematic diagram illustrating a comparison between the treatment effect of TiO2-based coagulant according to Example 1 and that of polymeric iron chloride when used for treating chrome tanning waste water.

FIG. 6 is a schematic diagram illustrating a comparison between the treatment effect of $TiO_2$-based coagulant and that of polymerization $FeCl_3$ when used for treating chrome tanning waste water. FIG. 6a shows the treatment effect when polymerization FeCl3 is used and FIG. 6b shows the treatment effect when $TiO_2$-based coagulant is used. As seen from FIG. 6, the floc generated during the coagulation process using the $TiO_2$-based coagulant is obviously larger than the floc generated when the polymerization $FeCl_3$ is used. After coagulation, the residual concentration of chrome in the supernatant was 3.98 mg/L, and the removal rate reached 74.2%; the effluent was clear and transparent with residual turbidity 1.44 NTU, and effluent pH was 9.48. The residual concentration of chrome was 6.20 mg/L after polymerization FeCl3 treatment, and the turbidity was 6.08 NTU and the treatment effect was obviously poorer than that achieved by the TiO2-based coagulant.

(8) Treatment of Industrial Park-Sourced Waste Water Using the TiO2-Based Coagulant (the Waste Water is Taken from an Industrial Park in Changzhou City, Jiangsu Province)

Water quality indicators of the industrial park-sourced waste water: initial pH: 8.3±0.1, initial turbidity: 17.3±1.0 NTU.

The TiO2-based coagulant was input at a dosage of 40 mg/l, the mixture was stirred at a rate of 200 rpm for 1 minute and then stirred at a rate of 40 rpm for 15 minutes, then the mixture was set still for 20 minutes, and finally the water quality was tested.

A comparison was made with commercial polymerization FeCl3 (the content of Fe is 30%, meeting industry level), which was input at a dosage of 40 mg/l, the mixture was stirred at a rate of 200 rpm for 1 minute and then stirred at a rate of 40 rpm for 15 minutes, then the mixture was set still for 20 minutes, and finally the water quality was tested.

Figure 7:
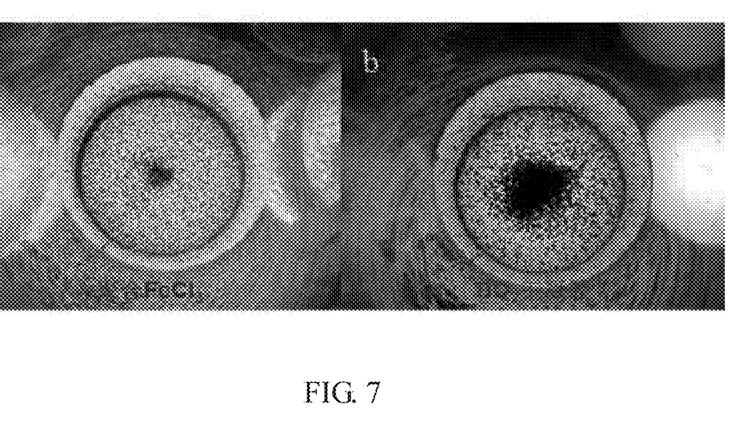
FIG. 7 is a schematic diagram illustrating a comparison between the treatment effect of TiO2-based coagulant according to Example 1 and that of polymeric iron chloride when used for treating industrial park-sourced waste water.

FIG. 7 is a schematic diagram illustrating a comparison between the treatment effect of TiO2-based coagulant and that of polymerization FeCl3 when used for treating industrial park-sourced waste water. FIG. 7a shows a treatment effect when polymerization FeCl3 is used, and FIG. 7b shows the treatment effect when TiO2-based coagulant is used. Upon completion of coagulation, the supernatant was taken and various parameters thereof were tested. As reflected by the test, after treatment using the TiO2-based coagulant the residue turbidity decreased to 1.33 NTU and the supernatant was clear and transparent. After treatment using the polymerization FeCl3, the residue turbidity was 2.20 NTU, and under the same dosage, the treatment effect thereof was poorer than that of the one using TiO2-based coagulant. In addition, the floc generated during the coagulation process using the TiO2-based coagulant was obviously larger than the floc generated when the polymerization FeCl3 was used, and the sedimentation speed was higher when the TiO2-based coagulant than when the polymerization FeCl3 was used.

(9) Treatment of Printing and Dyeing Waste Water (the Waste Water is Taken from a Printing and Dyeing Factory in Haimen City, Jiangsu Province)

Water quality indicators of the printing and dyeing waste water: initial pH: 8.3±0.1, initial turbidity 54.0±1.0 NTU.

The TiO2-based coagulant was input at a dosage of 40 mg/l, the mixture was stirred at a rate of 200 rpm for 1 minute and then stirred at a rate of 40 rpm for 15 minutes, then the mixture was set still for 20 minutes, and finally the water quality was tested.

A comparison was made with polymerization FeCl3 (the content of Fe is 30%, meeting industry level), which was input at a dosage of 40 mg/l, the mixture was stirred at a rate of 200 rpm for 1 minute and then stirred at a rate of 40 rpm for 15 minutes, then the mixture was set still for 20 minutes, and finally the water quality was tested.

Figure 8:
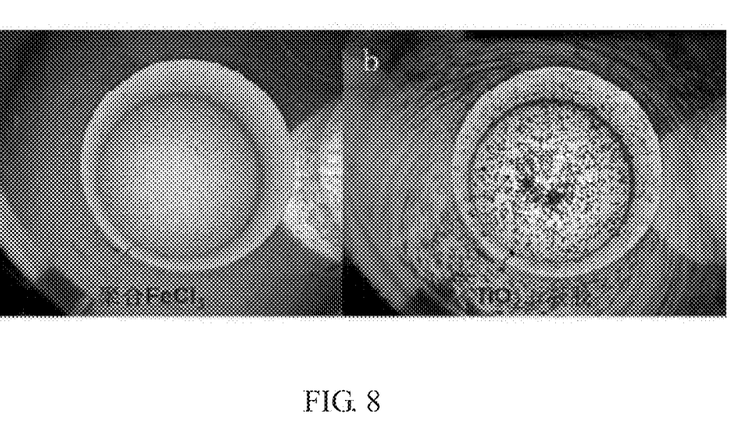
FIG. 8 is a schematic diagram illustrating a comparison between the treatment effect of TiO2-based coagulant according to Example 1 and that of polymeric iron chloride when used for treating printing and dyeing waste water.

FIG. 8 is a schematic diagram illustrating a comparison between the treatment effect of TiO2-based coagulant and that of polymerization FeCl3 when used for treating printing and dyeing waste water. FIG. 8a shows the treatment effect when polymerization FeCl3 is used, and FIG. 8b shows the treatment effect when TiO2-based coagulant is used. As seen from FIG. 8, the floc generated during the coagulation process using the TiO2-based coagulant is obviously larger than when polymerization FeCl3 is used. Upon completion of coagulation, the supernatant was taken and various parameters thereof were tested. After TiO2-based coagulant treatment, the residual turbidity decreased to 15.0 NTU, the supernatant is clear and transparent, and the effluent pH was 7.69 which was not notably lowered. After polymerization FeCl3 coagulant treatment, the residual turbidity increased to 68.4 NTU. Accordingly, with the same dosage, the TiO2-based coagulant achieves an obviously better treatment effect on the waste water than the polymerization FeCl3 does.

(10) Treatment of Tannery Waste Water (the Waste Water is Taken from a Printing and Dyeing Factory in Shijiazhuang City, Hebei Province)

Water quality indicators of the tannery waste water: initial pH: 7.8±0.1, initial turbidity 503.0.0±1.0 NTU. The waste water has very deep chrominance, and the coagulation effect may not be observed if the waste water is directly subjected to the coagulation experiment. Therefore, the tannery waste water was diluted using the tap water at a proportion of 1:5, and upon dilution, the pH was 7.3±0.1, and the turbidity was 40.6±1.0 NTU. The TiO2-based coagulant was input at a dosage of 60 mg/l, the mixture was stirred at a rate of 200 rpm for 1 minute and then stirred at a rate of 40 rpm for 15 minutes, then the mixture stood still for 20 minutes, and finally the water quality was tested.

Figure 9:
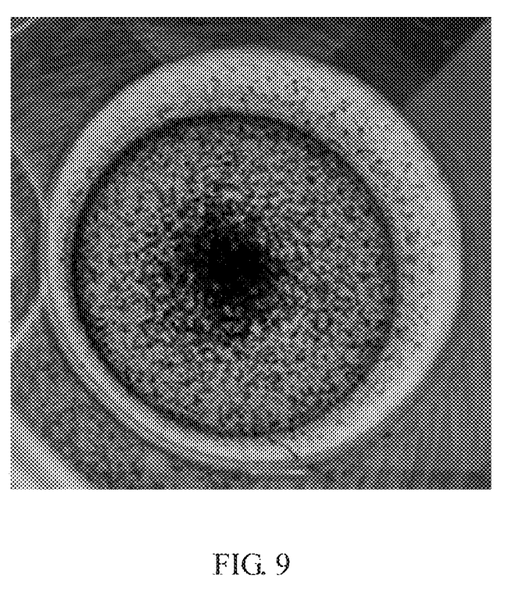
FIG. 9 is a schematic diagram illustrating the treatment effect of $TiO_2$-based coagulant according to Example 1 when used for treating tannery wastewater.

FIG. 9 is a schematic diagram illustrating the treatment effect of $TiO_2$-based coagulant when used for treating tannery waste water diluted with 5-foldstap water. As seen from FIG. 9, TiO2-based coagulant achieves a good coagulation effect in treating the printing and dyeing waste water; the generated floc is large, and the sedimentation speed is high. During coagulation, the turbidity of the 5-folds diluted decreased from 40.6 NTU to 1.81 NTU. For the tap water not diluted, the turbidity thereof decreased from 503 NTU to 26.2 NTU when the dosage of the $TiO_2$-based coagulant was 100 mg/L. TiO2-based coagulant achieves a good coagulation effect on the waste water.

As seen from (6) to (10), when the pH is 4-11, and the dosage is 20-100 mg/L, the TiO2-based coagulant has a good coagulation efficiency for the waste water.

Example 2

(1) 0.36 mL acetylacetone was added to 15 mL ethanol at a volume ratio of 1:42, the mixture was stirred at a rate of 200 rpm for 10 minutes, $TiCl_4$ was dropwise added, a molar ratio of the added $TiCl_4$ to the acetylacetone being 16:1 (about 3.11 ml of $TiCl_4$); and after the $TiCl_4$ was added, the mixture was stirred at a rate of 200 rpm for 10 minutes, to thus obtain a transparent solution, i.e., a solution A;

(2) 4 mL deionized water was uniformly mixed with 8 mL ethanol at a volume ratio of 1:2 to obtain a solution B, a molar ratio of the deionized water to the $TiCl_4$ being 4:1 in this embodiment;

(3) the solution B was dropwise added to the solution A at a rate of 1.5 ml/min, and then the mixture of the solutions was constantly stirred at a rate of 200 rpm for 40 minutes, to obtain a stable sol; and (4) the sol was placed in a 15° C. oven for aging (for about 15 days) until a constant weight is reached, to thus obtain the $TiO_2$-based coagulant.

Example 3

(1) 0.18 mL acetylacetone was added to 30 mL ethanol at a volume ratio of 1:166, the mixture was stirred at a rate of 300 rpm for 10 minutes, $TiCl_4$ was dropwise added, a molar ratio of the added $TiCl_4$ to the acetylacetone being 32:1 (about 3.11 ml of $TiCl_4$), and after added with the $TiCl_4$, the mixture was stirred at a rate of 300 rpm for 10 minutes, to obtain a transparent solution, i.e., a solution A;

(2) 0.5 mL deionized water was uniformly mixed with 11.5 mL ethanol at a volume ratio of 1:23 to obtain a solution B, a molar ratio of the deionized water to $TiCl_4$ being 1:1 in this embodiment;

(3) solution B was dropwise added to solution A at a rate of 0.8 mL/min, and then the mixture of the solutions was constantly stirred at a rate of 150 rpm for 50 minutes, to obtain a stable sol; and (4) the sol was placed in a 18° C. oven for aging (for about 12 days) until a constant weight is reached, to obtain the TiO2-based coagulant.

Example 4

(1) 1.44 mL acetylacetone was added to 25 mL ethanol at a volume ratio of 1:17, the mixture was stirred at a rate of 250 rpm for 10 minutes, TiCl4 was dropwise added, a molar ratio of the added TiCl4 to the acetylacetone being 4:1 (about 3.11 ml of TiCl4), and after added with the TiCl4, the solution was stirred at a rate of 250 rpm for 10 minutes, to obtain a transparent solution, i.e., a solution A;

(2) 1 mL deionized water was uniformly mixed with 11 mL ethanol at a volume ratio of 1:11 to obtain a solution B, a molar ratio of the deionized water to TiCl4 being 2:1 in this embodiment;

(3) the solution B was dropwise added to the solution A at a rate of 0.5 ml/min, and then the mixture of the solutions was constantly stirred at a rate of 250 rpm for 60 minutes, to obtain a stable sol; and d. the sol was placed in a 55° C. oven for aging (for about 5 days) until a constant weight is reached, to obtain the TiO2-based coagulant.

Example 5

(1) 2.16 mL acetylacetone was added to 15 mL ethanol at a volume ratio of 1:7, the mixture was stirred at a rate of 300 rpm for 10 minutes, TiCl4 was dropwise added, a molar ratio of the added TiCl4 to the acetylacetone being 2.7:1 (about 3.11 ml of TiCl4), and after added with the TiCl4, the mixture was stirred at a rate of 300 rpm for 10 minutes, to obtain a transparent solution, i.e., a solution A;

(2) 4 mL deionized water was uniformly mixed with 8 mL ethanol at a volume ratio of 1:2 to obtain a solution B, a molar ratio of the deionized water to TiCl4 being 8:1 in this embodiment;

(3) solution B was dropwise added to solution A at a rate of 1 mL/min, and then the mixture of solutions was constantly stirred at a rate of 300 rpm for 30 minutes, to obtain a stable sol; and d. the sol was placed in a 30° C. oven for aging (for about 5 days) until a constant weight is reached, to obtain the TiO2-based coagulant.

The TiO2-based coagulants prepared in Examples 1-5 were applied in the treatment of the humic acid-kaolin simulated water, and the results were analyzed.

Water quality indicators of the humic acid-kaolin simulated water sample: initial turbidity included the following: 21.0±0.5 NTU, DOC: 31.0±1.0 mg/L.

The TiO2-based coagulant was in 20 mg/L, the mixture was stirred at a rate of 200 rpm for 1 minute and then stirred at a rate of 40 rpm for 15 minutes, then the mixture was set still for 20 minutes, and finally the water quality was tested. As listed in Table 1, the coagulation effect on the effluent water is shown by the residual turbidity and DOC removal rate (%).

TABLE 1

Treatment effect of humic acid-kaolin simulated water sample with TiO2-based coagulants

| Indicator | Example | | | | |
|---|---|---|---|---|---|
| | 1 | 2 | 3 | 4 | 5 |
| Residual turbidity (NTU) | 3.45 | 5.72 | 6.34 | 5.16 | 6.52 |
| DOC removal rate (%) | 35.48 | 27.03 | 24.65 | 29.39 | 23.26 |

As seen from the results listed in Table 1, the TiO2-based coagulant synthesized according to the technical solution has a good coagulation effect; upon treatment of the simulated water samples using the TiO2-based coagulant, the effluent turbidity can all decrease to be lower than 7 NTU, and the DOC removal rates are all over 23%.

The embodiments of the present invention are not limited to those described above. Any modification, replacement and improvement made by any person under teachings of the present invention shall all fall within the protection scope defined by the claims of the present invention.

What is claimed is:

1. A $TiO_2$-based coagulant, wherein the coagulant is obtained by:
   (a) uniformly mixing acetylacetone and ethanol at a volume ratio of 1:7-166, dropwise adding titanium tetrachloride, and stirring at a rate of 100-300 rpm for 10 minutes to obtain a solution A, a molar ratio of the added titanium tetrachloride to the acetylacetone being 32-2.7:1;

(b) mixing deionized water and ethanol at a volume ratio of 1:2-23 to obtain a solution B;

(c) dropwise adding the solution B to the solution A, and then stirring for 30-60 minutes at a rate of 100-300 RPM to obtain a sol, a molar ratio of the added deionized water to the titanium tetrachloride being 1-8:1; and (d) placing the sol at 15° C.-55° C. to age till a weight thereof becomes constant, to obtain the $TiO_2$-based coagulant.

2. The $TiO_2$-based coagulant according to claim 1, wherein the dropwise adding the solution B to the solution A in step c comprises dropwise adding the solution B to the solution A at a rate of 0.5-1.5 mL/minute.

3. A method for treating waste water which comprises adding to the waste water a $TiO_2$-based coagulant as defined in claim 1.

4. A method according to claim 3 which comprises the further steps of (e) adjusting a pH value of the waste water to 4-11, and (f) inputting the $TiO_2$-based coagulant into the waste water in a dosage range of 20-100 mg/L for sedimentation of pollutants.

5. A method for treating algae-laden water which comprises adding to the algae-laden water a $TiO_2$-based coagulant as defined in claim 1.

6. A method according to claim 5 which comprises the further steps of (g) adjusting a pH value of the algae-laden water to 6-10, and (h) inputting the $TiO_2$-based coagulant into the algae-laden water in a range of 20-100 mg/L for sedimentation of pollutants.

7. A method for treating waste water which comprises adding to the waste water a $TiO_2$-based coagulant as defined in claim 2.

8. A method according to claim 7 which comprises the further steps of (e) adjusting a pH value of the waste water to 4-11, and (f) inputting the $TiO_2$-based coagulant into the waste water in a dosage range of 20-100 mg/L for sedimentation of pollutants.

9. A method for treating algae-laden water which comprises adding to the algae-laden water a $TiO_2$-based coagulant as defined in claim 2.

10. A method according to claim 9 which comprises the further steps of (g) adjusting a pH value of the algae-laden water to 6-10, and (h) inputting the $TiO_2$-based coagulant into the algae-laden water in a range of 20-100 mg/L for sedimentation of pollutants.

* * * * *